(12) United States Patent
Havar et al.

(10) Patent No.: US 9,452,823 B2
(45) Date of Patent: Sep. 27, 2016

(54) LIFT FLAP BEARING APPARATUS, LIFT FLAP ASSEMBLY, AIRFOIL AND AIRCRAFT

(75) Inventors: Tamas Havar, Bruckmuehl (DE); Juan Perez-Sanchez, Bad Aibling (DE); Tobias Ender, Bremen (DE); Oliver Seack, Bremen (DE)

(73) Assignees: EADS Deutschland GmbH, Ottobrunn (DE); Airbus Operations GmbH, Hamburg (DE)

( * ) Notice: Subject to any disclaimer, the term of this patent is extended or adjusted under 35 U.S.C. 154(b) by 242 days.

(21) Appl. No.: 14/345,054

(22) PCT Filed: Aug. 21, 2012

(86) PCT No.: PCT/EP2012/066245
§ 371 (c)(1),
(2), (4) Date: Oct. 20, 2014

(87) PCT Pub. No.: WO2013/037610
PCT Pub. Date: Mar. 21, 2013

(65) Prior Publication Data
US 2015/0060607 A1    Mar. 5, 2015

(30) Foreign Application Priority Data

Sep. 16, 2011 (DE) .................. 10 2011 082 888

(51) Int. Cl.
| | |
|---|---|
| B64C 3/50 | (2006.01) |
| B64C 13/28 | (2006.01) |
| B64C 9/16 | (2006.01) |
| B64C 3/54 | (2006.01) |
| B64C 9/02 | (2006.01) |

(52) U.S. Cl.
CPC ............... *B64C 13/28* (2013.01); *B64C 3/54* (2013.01); *B64C 9/02* (2013.01); *B64C 9/16* (2013.01)

(58) Field of Classification Search
USPC .................. 244/215, 213, 212, 201, 198
See application file for complete search history.

(56) References Cited

U.S. PATENT DOCUMENTS

| | | | | |
|---|---|---|---|---|
| 2,202,430 | A | * 5/1940 | Rebeski | B64C 9/16 244/216 |
| 2,502,315 | A | * 3/1950 | Earhart | B64C 9/16 244/216 |
| 2,836,380 | A | 5/1958 | Pearson | |

(Continued)

FOREIGN PATENT DOCUMENTS

| | | |
|---|---|---|
| CN | 1918033 A | 2/2007 |
| DE | 37 13 465 A1 | 11/1988 |

(Continued)

OTHER PUBLICATIONS

International Search Report for PCT/EP2012/066245, issued on Dec. 5, 2012.

(Continued)

*Primary Examiner* — Christopher P Ellis
(74) *Attorney, Agent, or Firm* — Global IP Counselors, LLP

(57) ABSTRACT

A lift flap bearing apparatus is improved with respect to aerodynamics, construction space and assembly, for guiding and adjusting a first lift flap and a second lift flap. The lift flap bearing apparatus comprises a first guiding device for guiding the first lift flap and a second guiding device for guiding the second lift flap. The first and the second guiding devices each have a first curved guide rail and a second curved guide rail.

20 Claims, 13 Drawing Sheets

(56) References Cited

U.S. PATENT DOCUMENTS

| | | | | |
|---|---|---|---|---|
| 2,938,680 A | * | 5/1960 | Greene | B64C 9/22 244/210 |
| 3,480,235 A | | 11/1969 | Multhopp | |
| 3,583,660 A | * | 6/1971 | Hurkamp | B64C 9/146 244/207 |
| 3,698,664 A | * | 10/1972 | Bonney | B64C 9/16 244/216 |
| 3,785,594 A | * | 1/1974 | Lee | B64C 9/16 244/216 |
| 4,361,299 A | * | 11/1982 | Sharrock | B64C 9/16 244/216 |
| 4,471,927 A | * | 9/1984 | Rudolph | B64C 9/16 244/215 |
| 4,725,026 A | * | 2/1988 | Krafka | B64C 9/16 244/213 |
| 4,854,528 A | * | 8/1989 | Hofrichter | B64C 9/18 244/130 |
| 5,163,534 A | * | 11/1992 | Hillman | B64C 9/00 184/27.1 |
| 5,839,699 A | * | 11/1998 | Bliesner | B64C 9/24 244/214 |
| 6,598,834 B2 | * | 7/2003 | Nettle | B64C 3/48 244/212 |
| 7,004,432 B2 | * | 2/2006 | Robinson | B64C 9/14 244/211 |
| 8,424,807 B2 | * | 4/2013 | Sutton | B29C 43/12 244/123.1 |
| 8,596,583 B2 | * | 12/2013 | Eichhorn | B64C 9/04 244/213 |
| 8,613,409 B2 | * | 12/2013 | Cazals | B64C 9/16 244/213 |
| 9,016,623 B2 | * | 4/2015 | Maclean | B64C 9/02 244/99.2 |
| 2002/0005461 A1 | | 1/2002 | Nettle et al. | |
| 2013/0334363 A1 | * | 12/2013 | Lam | B64C 9/02 244/99.3 |

FOREIGN PATENT DOCUMENTS

| | | |
|---|---|---|
| EP | 0 230 061 A1 | 7/1987 |
| EP | 0 503 158 A1 | 9/1992 |
| EP | 0 838 394 A2 | 4/1998 |
| WO | 03/008266 A1 | 1/2003 |

OTHER PUBLICATIONS

The Office Action for the corresponding Chinese application No. 201280045247.4, issued on Apr. 23, 2015.

* cited by examiner

FIG 21a
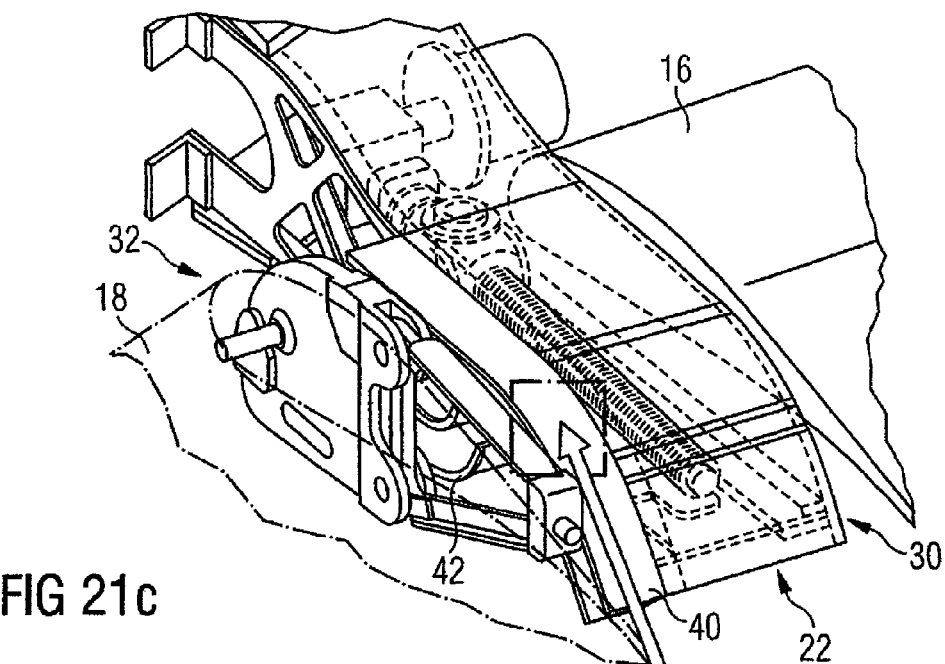
FIG 21c
FIG 21b
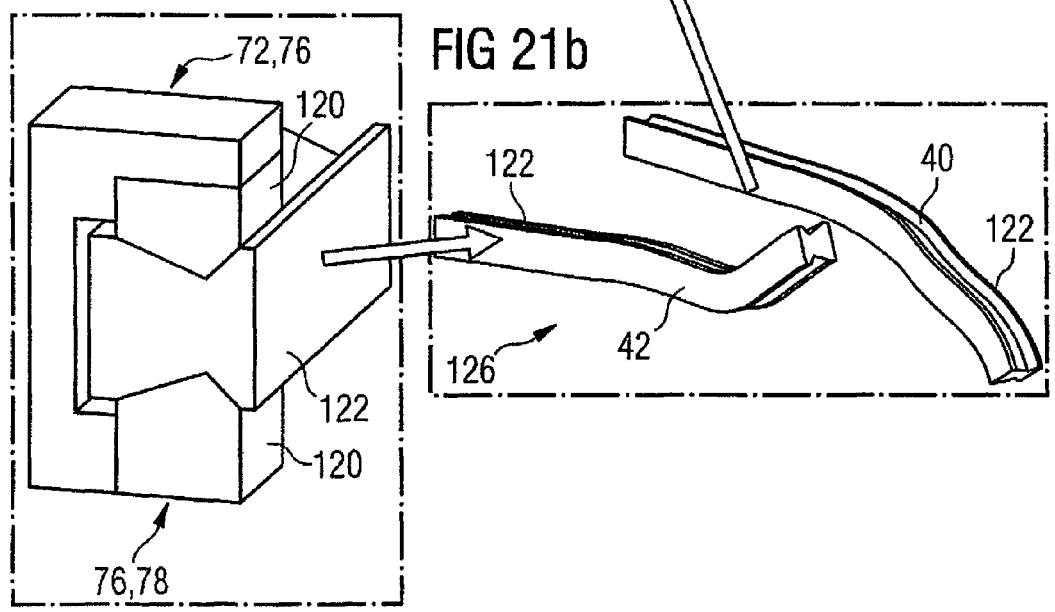

FIG 28
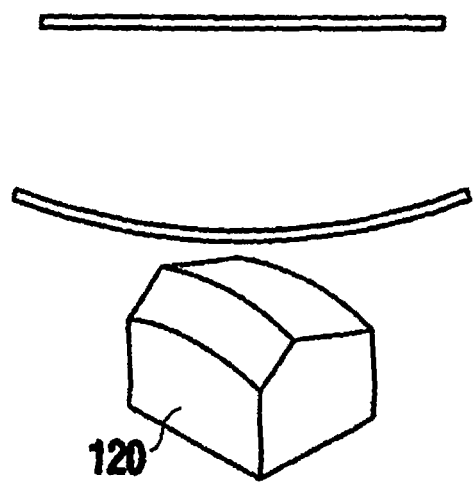
FIG 29
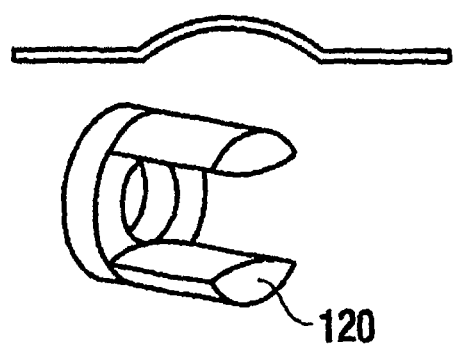
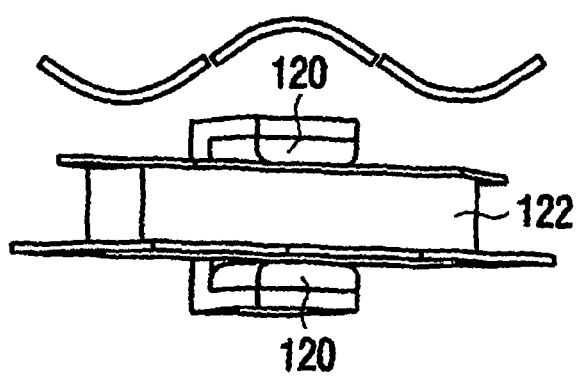
FIG 30

LIFT FLAP BEARING APPARATUS, LIFT FLAP ASSEMBLY, AIRFOIL AND AIRCRAFT

CROSS-REFERENCE TO RELATED APPLICATIONS

This U.S. National stage application claims priority under 35 U.S.C. §119(a) to German Patent Application No. 10 2011 082 888.5, filed on Sep. 16, 2011, the entire contents of German Patent Application No. 10 2011 082 888.5 are hereby incorporated herein by reference.

BACKGROUND

1. Field of the Invention

The invention relates to a lift flap bearing apparatus for guiding and adjusting a lift flap. Further, the invention relates to a lift flap assembly with such a lift flap bearing apparatus. Further, the invention relates to an airfoil for an aircraft with such a lift flap assembly. Finally, the invention relates to an aircraft provided with such an airfoil.

2. Background Information

A driving and guiding device for a flap disposed on an aircraft airfoil is known from EP 0 503 158 A1. The known driving and guiding device comprises a carriage formed by a car, on which the flap is retained in a moveable manner, wherein the carriage is displaceable on a support and guide rail and can be driven by means of an actuator. The actuator acts via a lever mechanism with a driving lever and a driving rod.

From WO 03/008266 A1 a lift flap mechanism is known for adjusting a lift flap associated with an airfoil by means of a drive system. The known lift flap mechanism is mounted on one of several flap supports attached to the airfoil and comprises a steering lever assembly for forming a primary connection mechanism and a guiding lever for forming a secondary connection mechanism.

SUMMARY

The invention is based on the object of providing a lift flap bearing apparatus for guiding and adjusting lift flaps that makes improvements possible with respect to the construction space, manufacturability and/or weight optimizations.

The invention provides a lift flap bearing apparatus for guiding and adjusting a first lift flap and a second lift flap, comprising
a first guiding device for guiding the first lift flap and a second guiding device for guiding the second lift flap,
with the first and second guiding devices each having two curved guide rails.

It is provided in an advantageous embodiment that the first guiding device is disposed on a first side of the lift flap bearing apparatus and the second guiding device is disposed on a second side that is orientated opposite to the first side.

It is particularly preferred that a driving device for the simultaneous adjustment of the first and second guiding devices is provided.

It is preferably provided that at least one of the guiding devices comprises a guiding carriage which, displaceable by means of a first rail hinge mounting, is displaceably guided on a first curved guide rail of the guiding device, and, displaceable by means of a second rail hinge mounting, is displaceably guided on a second curved guide rail.

It is provided according to an embodiment of the invention that the at least one guiding carriage comprises a first flap attachment region with at least one first flap attachment device and a second flap attachment region with at least one second flap attachment device, the first and second flap attachment devices being spaced apart, the first and second flap attachment regions of the guiding carriage being attached to one another so as to be moveable relative to one another in a direction extending transverse to an adjusting direction guided by the guiding device.

It is preferred that the first and the second guiding devices are each provided with the guiding carriage, the first guiding carriage of the first guiding device and the second guiding carriage of the second guiding device being interconnected by means of a cross-connection.

It is particularly preferred that there is provided a basic body attachable to an airfoil, or a basic body that comprises on a first side the first and the second guide rails of the first guiding device, and on a second side, which is orientated opposite, the first and the second guide rails of the second guiding device.

Preferably, it is provided that a carriage assembly formed by the first guiding carriage, the second guiding carriage and the cross-connection surrounds the basic body.

In an advantageous embodiment, it is provided that the driving device disposed in the basic body acts on the carriage assembly, in particular on the cross-connection.

It is preferred that at least one of the rail hinge mountings comprises, as a gripping member for gripping the associated guide rail, at least one roller that acts on at least one roller track of the associated guide rail and/or that at least one of the rail hinge mountings comprises, as a gripping member, at least one sliding member that acts on a sliding track of the associated guide rail.

It is particularly preferred that at least one of the rail hinge mountings is in positive engagement with the associated guide rail in order to absorb lateral transverse forces.

It is preferably provided that the first rail hinge mounting is displaceably supported on a first supporting surface on the first guide rail, while the second rail hinge mounting is displaceably supported on a second supporting surface on the second guide rail, the first supporting surface being larger than the second supporting surface, and/or the first supporting surface extending over a greater distance in the displacement direction than the second supporting surface.

According to another aspect the invention provides a lift flap assembly, comprising a first lift flap and a second lift flap and a lift flap bearing apparatus according to the invention or according to an advantageous embodiment thereof, which is disposed between the first and the second lift flaps.

According to another aspect, the invention provides an airfoil for an aircraft equipped with such a lift flap assembly.

According to another aspect, the invention provides an aircraft equipped with such an airfoil.

Preferably, the lift flaps are landing flaps.

In a particularly preferred embodiment of the invention, guiding devices for guiding the two landing flaps are provided in the middle, between two landing flaps, with at least two curved guide rails for adjustment and preferably a drive unit for joint adjustment of the lift flaps being provided on both sides.

The advantages of the invention or of advantageous embodiments thereof are, in particular:
Only a smaller construction space is required for the bearing apparatus and the adjusting device for bearing and adjusting the lift flaps;
With regard to its structure, the lift flap bearing apparatus is lighter than lift flap bearing and adjusting devices known up to this point;

The lift flap assembly is easier to manufacture; in particular, a simpler assembly is made possible and/or assembly time can be saved;

Due to the compact configuration, a smaller head surface and thus a lower drag and therefore better aerodynamics can be obtained;

A demanded landing flap position in the deployed state with optimum aerodynamics is easier to achieve than with the bearing and/or adjusting devices known up to this point;

An optimum bearing for so-called multispar landing flaps and/or composite material landing flaps with transverse spar reinforcements can be obtained.

According to a preferred embodiment, at least one car or carriage is provided, on which at least one lift flap can be suspended in a swinging manner. For this purpose, the guiding carriage is preferably divided into at least two lift flap attachment regions that are moveable relative to each other in order thus to compensate tilting and/or bending of the lift flaps attached thereto.

Preferably a basic body or base body is provided, on which guiding devices with several curved guide rails are provided and which can be attached to a wing structure, for example on an airfoil.

Preferably, a carriage assembly is provided which surrounds this basic body and thus contributes to reinforcement. Thus, there is little likelihood of lift flaps drifting out of their guides.

Such a carriage assembly can also be used for the action of a drive unit for jointly driving several lift flaps.

Moreover, such a carriage assembly can be utilized for attaching an aerodynamic fairing for the guiding element, which can then be adjusted jointly with the carriage assembly and the lift flaps. An overall improvement of aerodynamics can thus be achieved; slots and gaps in the different positions can be reduced.

Preferably a lateral fixing of the lift flaps for absorbing transverse loads is provided. For example, this can be accomplished through a positive contact to the associated guide rail of a rail hinge mounting that can be connected to the lift flaps.

Alternatively or additionally, a third guide rail, e.g. on one of the horizontal sides, e.g. the upper side or underside, can be provided for lateral fixing, which is surrounded, preferably positively, by a guide member so as to be displaceable in the longitudinal direction but fixed in the lateral direction.

The rail hinge mountings on the at least two curved guide rails are preferably configured in different manners. For example, one of the rail hinge mountings on a first rail is displaceably accommodated on the associated guide rail in such a way that it is supported on a larger longitudinally orientated supporting surface. This can be accomplished, for example, by a roller assembly with several rollers, by means of an elongate sliding member or by means of several longitudinally consecutive sliding members. Preferably, a smaller and lighter rail hinge mounting, which comprises, for example, only one roller or only a smaller sliding member, is provided on the further guide rail.

The rail hinge mountings can comprise, for example, roller and/or sliding members, with the guide rails respectively being configured in a complimentary manner. Configurations are conceivable in which the rail hinge mountings surround a guide rail, as well as configurations in which the guide rails surround gripping members—e.g. roller or sliding members. The engagement between the guide rail and the associated gripping member can be configured as a positive engagement for lateral fixing, for example through appropriate complementary profiles (e.g. projection-recess formations) of the gripping members and the guide rail profiles.

Preferably, metal for the guide rails and metal and/or composite materials for the basic body are provided as materials.

A driving device can comprise, for example, a motor-driven spindle which is connected via a spindle nut and a connecting rod to an assembly guided in the guiding devices. Preferably, the driving device acts on a cross-connection between two carriages guided laterally with respect to a basic body.

DESCRIPTION OF THE DRAWINGS

Exemplary embodiments of the invention will be explained in more detail below with reference to the attached drawings. In the drawings:

FIGS. 21a through 21c show perspective views of a lift flap bearing apparatus (FIG. 21a) according to another embodiment of the invention and two details (FIGS. 21b and 21c) of a guiding device thereof;

FIG. 28 shows a schematic and perspective view of contours of a gripping member according to another embodiment of the guiding device;

FIG. 29 shows a schematic contour and a gripping member according to yet another embodiment of a guiding device; and FIG. 30 shows a schematic contour of another gripping member and a perspective view of the engagement of the gripping member on a guide rail.

DETAILED DESCRIPTION OF EMBODIMENTS

Figure 1:
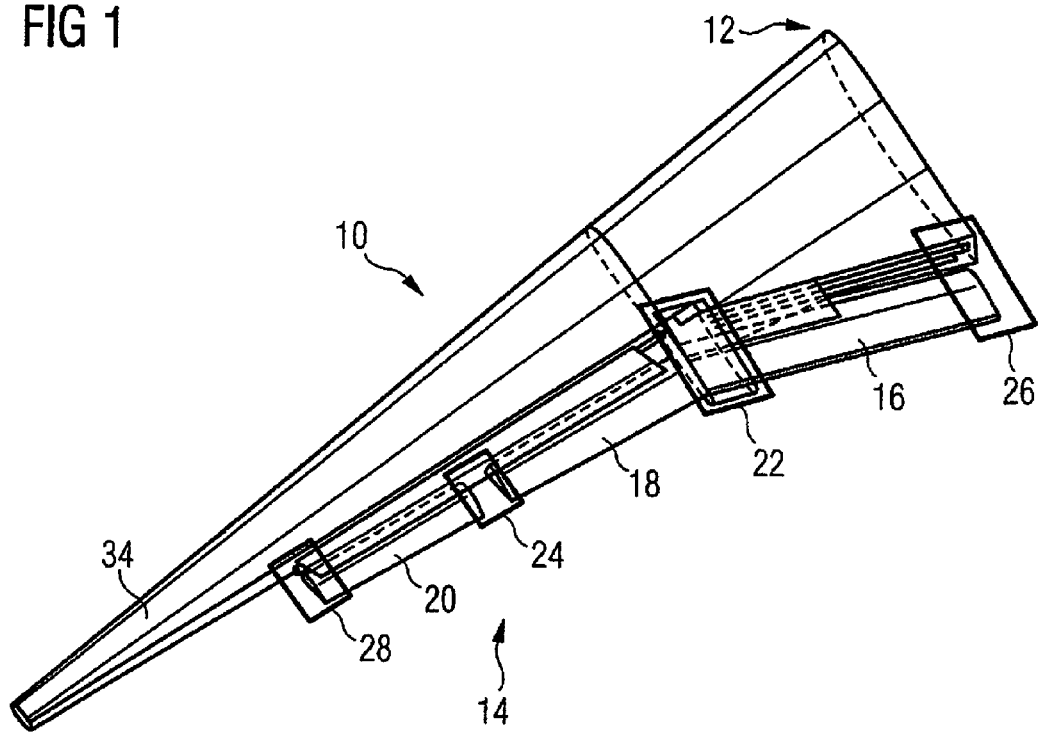
FIG. 1 shows a schematic perspective view of an airfoil with a lift flap assembly with several lift flaps and with several lift flap bearing apparatuses.

FIG. 1 shows an airfoil 10 that forms a part of an aircraft 12. In the region of its rear edge, the airfoil 10 comprises a lift flap assembly 14 with several lift flaps 16, 18, 20.

The lift flaps 16, 18, 20 are, for example, landing flaps, which are deployed in the take-off phase and/or landing phase in order to increase the lift of the airfoil 10, and which are retracted at higher airspeeds in order to optimize flight operations.

The lift flap assembly 14 comprises a first lift flap 16, a second lift flap 18 and a third lift flap 20, as well as a first lift flap bearing apparatus 22 between the first lift flap 16 and the second lift flap 18, and a second lift flap bearing apparatus between the second lift flap 18 and the third lift flap 20. The first lift flap 16 is mounted, on the end thereof opposite from the lift flap bearing apparatus 22, in a lift flap bearing device 26, and the third lift flap 20 is mounted, on the end thereof oriented opposite to the second lift flap bearing apparatus 24, in a lift flap bearing device 28.

For example, the first lift flap 16 is formed by an inner landing flap that is mounted, at the inner end thereof which is directed towards the aircraft fuselage, on an inner lift flap bearing device 26, and, at the outer end thereof which is directed towards the free end of the airfoil 10, in the first lift flap bearing apparatus 22. For example, the second lift flap 18 is a middle landing flap that is mounted, with the inner end thereof which is directed towards the aircraft fuselage, in the first lift flap bearing apparatus 22, and, at the outer end thereof which is directed towards the free end of the airfoil 10, in the second lift flap bearing apparatus 24. For example, the third lift flap 20 is an outer landing flap that is mounted, with the inner end thereof which is directed towards the aircraft fuselage, in the second lift flap bearing apparatus 24, and, at the outer end thereof which is directed towards the free end of the airfoil 10, in an outer lift flap bearing device 28.

Figure 2:
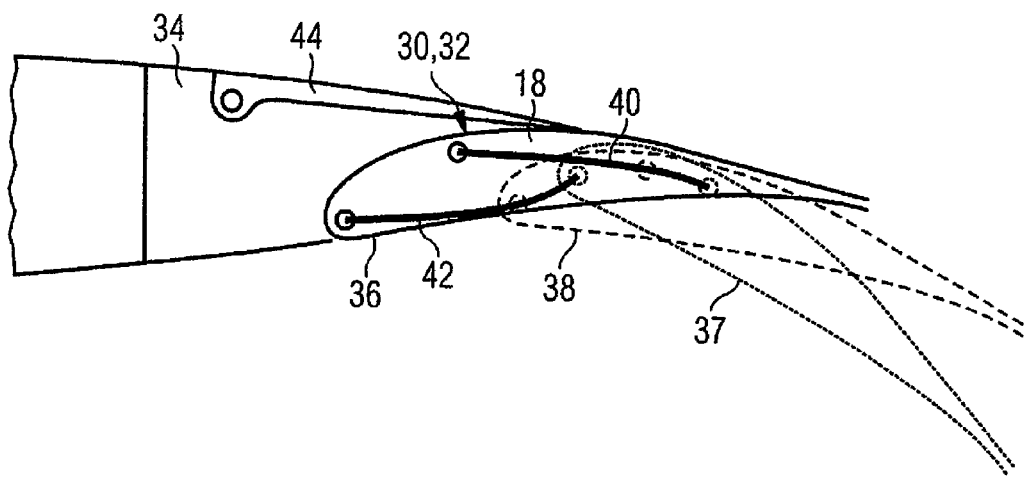
FIG. 2 shows a schematic cross-sectional view through the airfoil of FIG. 1 for illustrating the adjusting movement of the lift flaps guided by the lift flap bearing apparatus.
Figure 3:
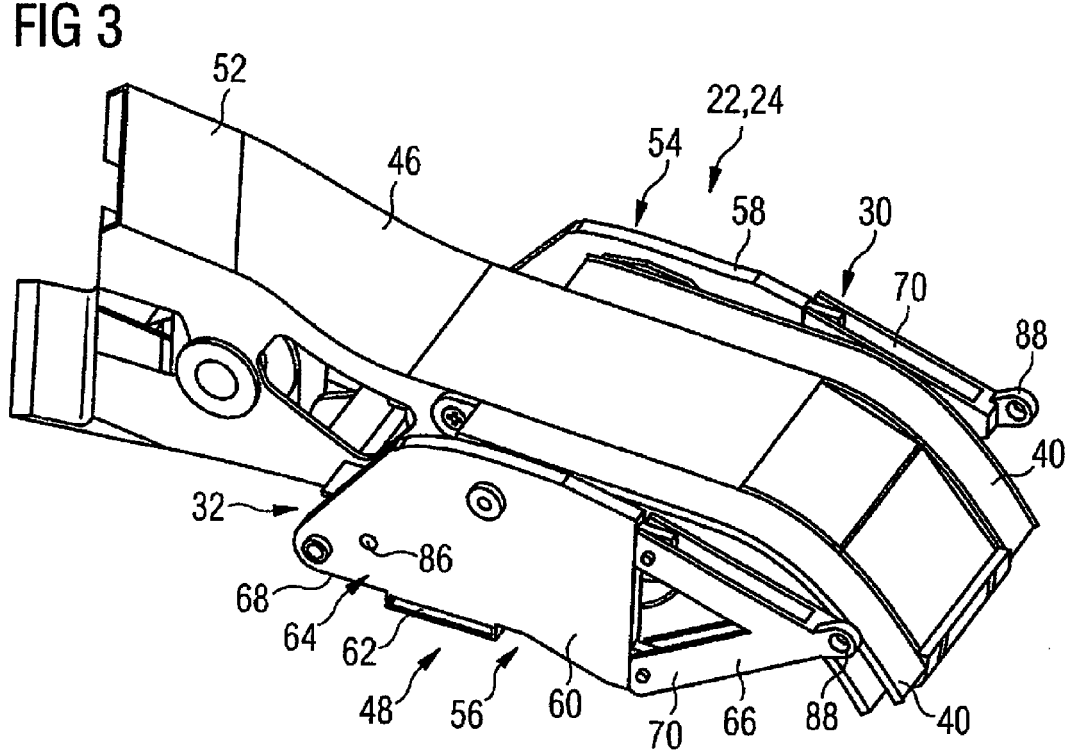
FIG. 3 shows a first perspective view of a lift flap bearing apparatus.

The lift flap bearing apparatuses 22, 24 and the lift flap bearing devices 26, 28 comprise guiding devices 30, 32 that are shown in more detail schematically in FIG. 2 in order to illustrate the function. In a profile cross section, FIG. 2 shows the region of the rear edge of the airfoil 10 with the airfoil profile 34 and with the second lift flap 18, which is shown—depicted with continuous lines—in a fully retracted position 36 for normal flight operations, in a fully deployed position 37 for the greatest lift, for example during landing approach, and in an intermediate position 38. The adjusting movement of the lift flap 18 is guided by the guiding devices 30, 32 on the lift flap bearing apparatuses 22, 24 or on the lift flap bearing devices 26, 28 and driven by a drive unit, which will be explained later, in the respective lift flap bearing apparatus 22, 24.

For this purpose, the guiding devices 30, 32 each have a first curved guide rail 40 and a second curved guide rail 42. The first guide rail 40 is, for example, an upper guide rail; and the second guide rail 42 is, for example, a lower guide rail. The guide rails 40, 42 have such a curve and extend in such a manner that the respectively desired adjusted positions—position of the lift flap 16, 18, 20 in the longitudinal direction of the aircraft 12 and inclination of the lift flap 16, 18, 20 relative to the airfoil 10—can be reached in the case of the displacement of the lift flaps 16, 18, 20 mounted on the guiding devices 30, 32.

Furthermore, FIG. 2 indicates above the lift flap assembly 14 a spoiler 44 that can be folded upwards, for example for braking during landing or for steering support during flight operations.

A preferred embodiment of the lift flap bearing apparatuses 22, 24 will be explained in more detail with reference to the exemplary illustrations of the FIGS. 3 to 18. The structure of the first lift flap bearing apparatus 22 and the second lift flap bearing apparatus 24 is similar and comparable in principle, and will therefore be explained in more detail only with reference to the example of the first lift flap bearing apparatus 22. The lift flap bearing apparatus 24 has a completely analogous structure.

The lift flap bearing apparatus 22 comprises a basic body 46, a carriage assembly 48 and a driving device 50.

The basic body 46 can be solidly connected, with its front end region 52, with the structure of the airfoil 10 so that the basic body 46 is arranged in a stationary manner.

The carriage assembly 48 is guided on the guiding devices 30, 32 so as to be displaceable in the longitudinal direction relative to the basic body 46. The lift flaps 16, 18, which are not shown in FIGS. 3 and 4, can be attached with their respective end regions to the carriage assembly 48 (see, for example, FIG. 18).

Figure 4:
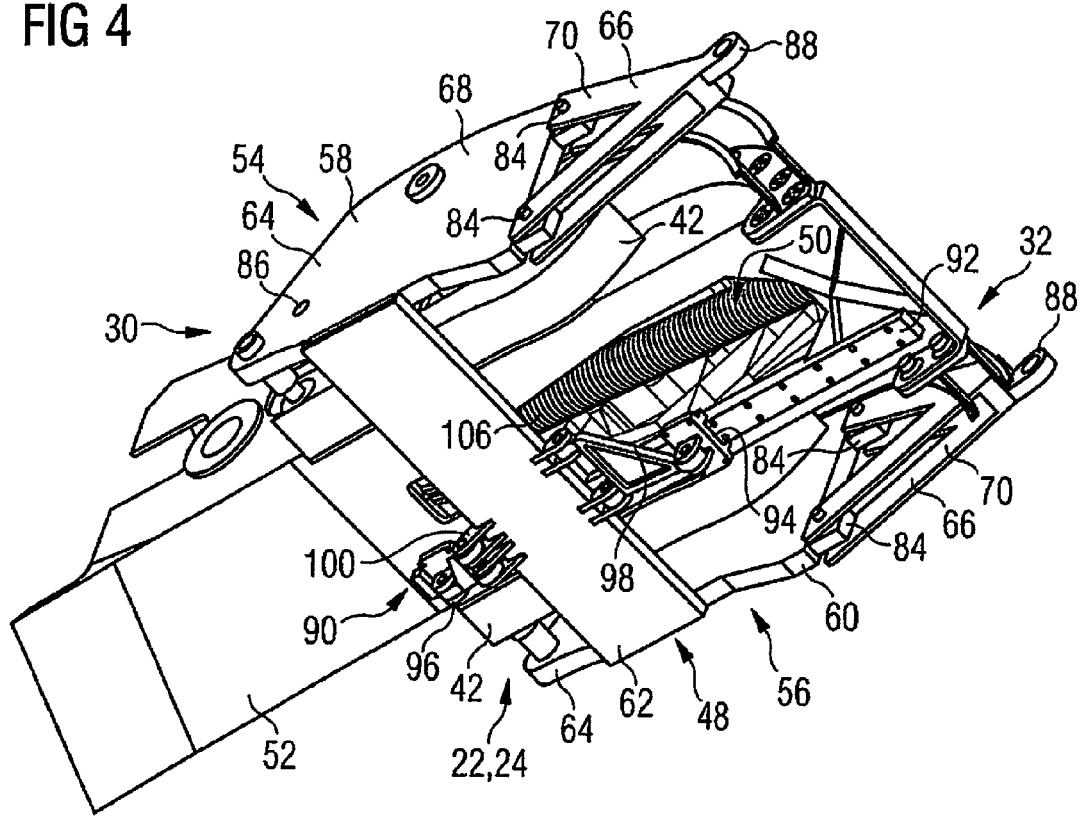
FIG. 4 shows a second perspective view of a lift flap bearing apparatus.
Figure 9:
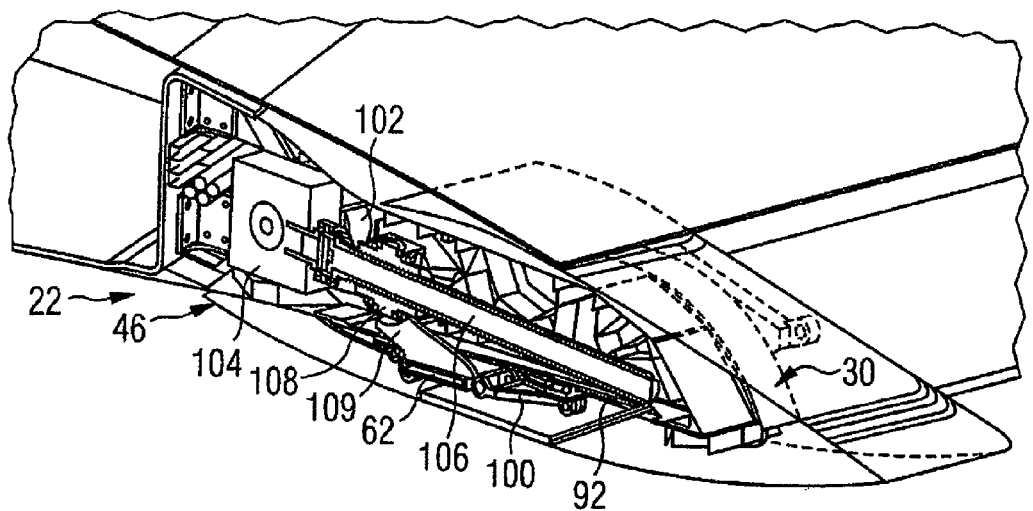
FIG. 9 shows a schematic perspective sectional view through the rear region of the airfoil of FIG. 1 at the level of a longitudinal central axis through the lift flap bearing apparatus.
Figure 18:
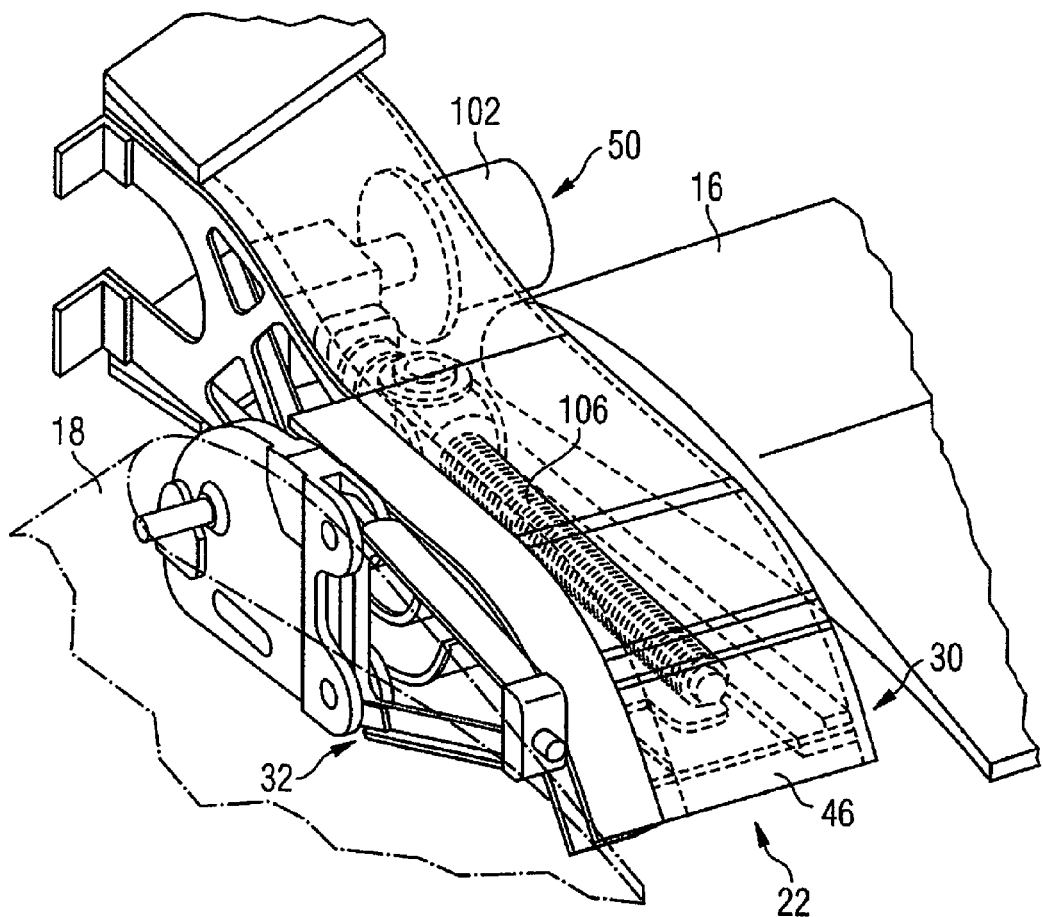
FIG. 18 shows another schematic perspective view of the lift flap bearing apparatus with details of the guiding carriage.

The driving device 50, which is depicted in FIGS. 4, 9 and 18, serves for the motoroperated driving of the movement of the carriage assembly 48 in order thus to jointly adjust the lift flaps 16, 18 attached to the carriage assembly 48.

Figure 5:
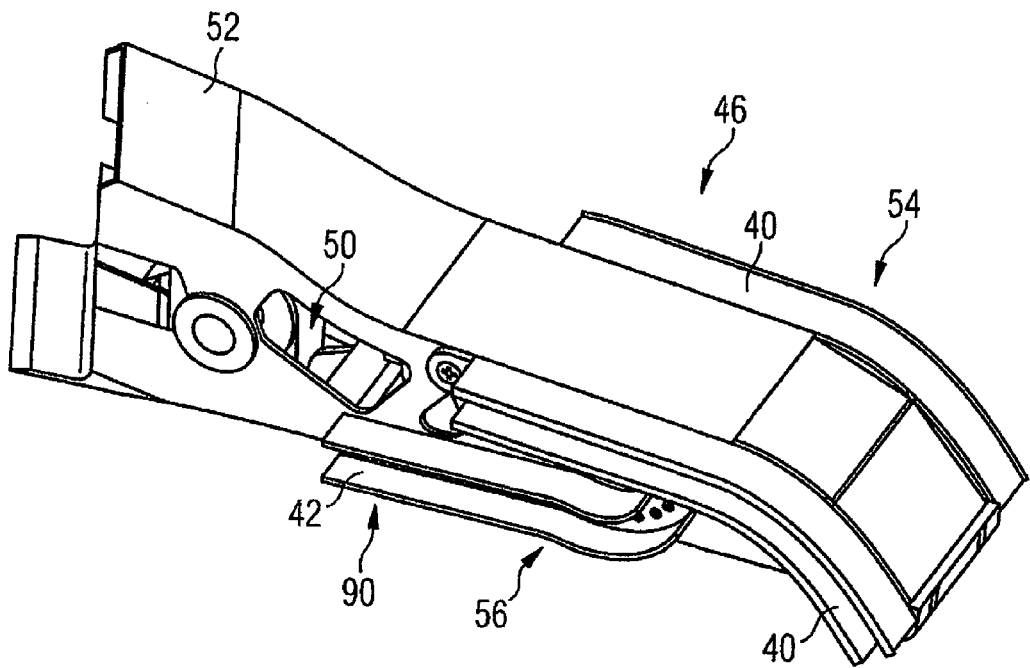
FIG. 5 shows a schematic perspective view of a basic body of the lift flap bearing apparatus.
Figure 6:
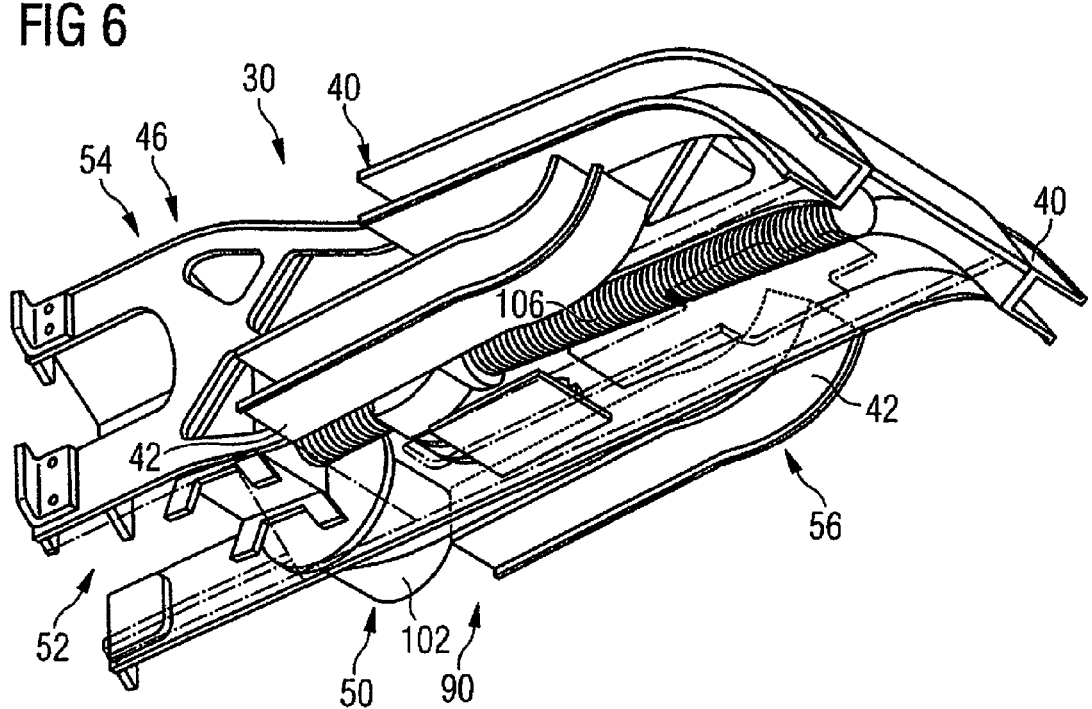
FIG. 6 shows another schematic perspective view of the basic body of the lift flap bearing apparatus.

As is apparent from FIGS. 5 and 6, which show the basic body 46 without the carriage assembly 48, the basic body 46 is provided on a first side 54—for example the inner side directed towards the aircraft fuselage—with a first guiding device 30 for guiding the first lift flap 16, and is provided on its second side 56, which is orientated opposite to the first side 54—for example the outer side directed towards the free end of the airfoil 10—with a second guiding device 32 for guiding the second lift flap 18. Both the first guiding device 30 and the second guiding device 32 each comprise the first curved guide rail 40 and the second curved guide rail 42. The first guiding device 30 and the second guiding device 32 can be configured as mirror images of each other, or they can be configured to differ from each other to a certain extent, in order to enable a different movement of the lift flaps 16, 18 mounted on the first lift flap bearing apparatus 22.

Figure 7:
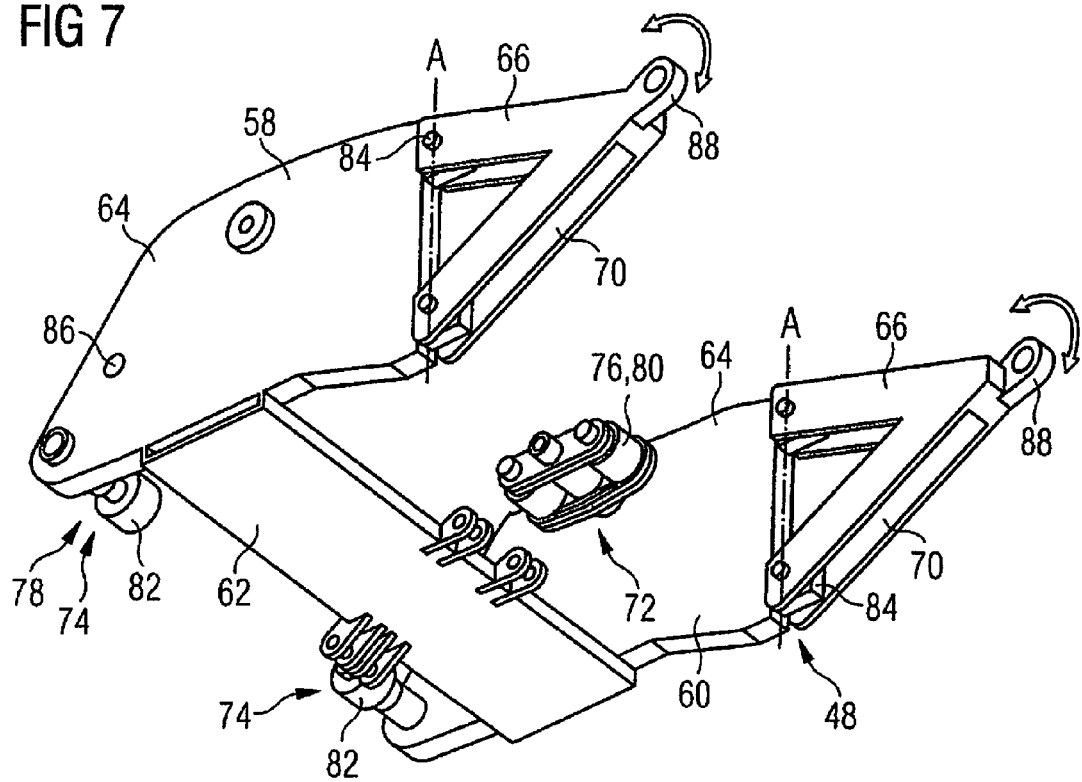
FIG. 7 shows a schematic perspective view of a carriage assembly of the lift flap bearing apparatus of FIGS. 3 and 4.

The carriage assembly 48, which is shown in more detail in FIG. 7 without the basic body 46, comprises a first guiding carriage 58, a second guiding carriage 60 and a cross-connection 62 that connects the first guiding carriage 58 with the second guiding carriage 60.

The first guiding carriage 58 is guided in the first guide rail 40 and the second guide rail 42, which are disposed on the first side 54 on the basic body 46, so that the first guiding device 30 is formed by this first guide rail 40, the second guide rail 42 and the first guiding carriage 58. The second guiding device 32 is formed correspondingly by the guide rails 40, 42 disposed on the second side 56 and the second guiding carriage 60 guided therein.

Each of the guiding carriages 58, 60 comprises a first flap attachment region 64 and a second flap attachment region 66 which are hinge-mounted so as to by moveable relative to each other to a certain extent.

For example, the first flap attachment region 64 is formed by a main carriage body 68 and the second flap attachment region 66 can be formed by a pivot arm 70.

The first flap attachment region 64 is preferably provided with a first rail hinge mounting 72 for hinge-mounting the guiding carriage 58, 60 to the first guide rail 40, and is further provided with a second rail hinge mounting 74 for hinge-mounting the guiding carriage 58, 60 to the second guide rail 42. The rail hinge mountings 72, 74 comprise gripping members or engaging members for gripping the respective guide rails 40, 42.

In the exemplary embodiment shown in FIGS. 3 to 8, a first gripping member 76 comprises a roller assembly 80 with several rollers, which engage into the first guide rail 40, which in this embodiment is formed in a channel shape, and are thus surrounded on both sides by the first guide rail 40. Furthermore, a second gripping member 48 in the embodiment shown here comprises a single roller 82, which engages into the second guide rail 42, which in this case is also formed in a channel shape, and is thus surrounded on both sides by the second guide rail 42 for guidance. The first flap attachment region 64 is thus guided in the guide rails 40, 42. The first gripping member 46 in this case guides in such a way that greater loads and torques can be introduced into the first guide rail, while the second gripping member 78 serves for directional guidance and added support.

As is indicated in FIG. 7, the second flap attachment region 66 is hinge-mounted to the first flap attachment region 64 in such a way that it can swing, relative to the first flap attachment region 64, to the left or right side about a vertical axis A, as is illustrated by arrows.

For example, the pivot arm 70 is hinge-mounted to the main carriage body 78 by means of two spherical bearings 84.

The first flap attachment region 64 comprises a first flap attachment device 86 in order to attach a front end region of the respective lift flap 16, 18 to the first flap attachment region 64. For example, the first flap attachment device 86 comprises as a flap attachment device 86 a bore for a fastening bolt 85 (see FIGS. 14 and 16). The second flap attachment region 66 comprises a second flap attachment device 88 which is spaced from the first flap attachment device 86 in the longitudinal direction. The second flap attachment device 88 serves for attachment to the region of the respective lift flap 16, 18 that is situated further to the rear, and may also comprise a corresponding bore.

As is apparent from the illustrations of FIGS. 4 and 6, the basic body 46 comprises on a third side 90—in this case, for example, the underside—a third guide rail 92, on which, spaced apart in the longitudinal direction, a first guide member 94 and a second guide member 96 are guided, fixed towards the side by a positive fit. The guide members 94, 96 are connected by connecting rods 98, 100 with the cross-connection 62. The connecting rods 98, 100 are connected to the guide members 94, 96 in an articulated manner and connected to the cross-connection 62 in such an articulated manner that the differences in height as well as the inclinations of the cross-connection 62 relative to the third guide rail 92 can be compensated, but that torques about a vertical axis and lateral loads are supported.

The cross-connection 62 is formed as a rod-shaped member or elongated plate member and interconnects the two main carriage bodies 68 or, more generally, the first flap attachment region 64 of the first guiding carriage 58 and the first flap attachment region 64 of the second guiding carriage 60. On the whole, the carriage assembly 48 is thus configured so as to surround the basic body 46. Thus, a reinforcement can be achieved even if light-weight materials are used.

An additional reinforcement and lateral fixing is the result of the further guidance of the carriage assembly 48 on the third guide rail 92, which also enables a lateral fixing of the carriage assembly 48 as well as a support against tilting. Tilting of the lift flaps 16, 18 relative to the airfoil 10 or the lift flap bearing apparatus 22 can be compensated by the swinging suspension of the flap attachment regions 64, 66.

Figure 8:
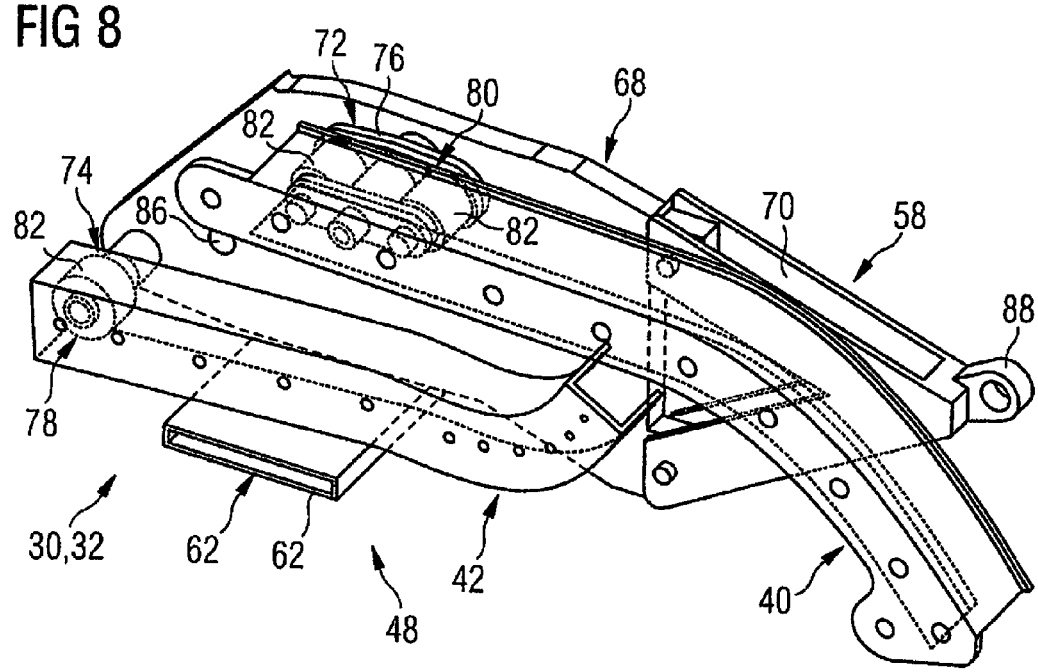
FIG. 8 shows a perspective schematic view of a portion of the carriage assembly of FIG. 7 in engagement with a guiding device of the basic body of FIG. 5.

FIG. 8 shows the guidance of the respective guiding carriage 58 in the first guide rail 40 and the second guide rail 42 by means of the gripping members 76, 78.

As is apparent from FIG. 9, the driving device 50 further acts on the cross-connection 62 in order to drive the movement of the carriage assembly 48 in the longitudinal direction along the guide rails 40, 42.

As is apparent from FIGS. 9 and 18, the driving device 50 for this purpose comprises an electric motor 102 with a gear unit 104 connected thereto and a spindle 106 rotationally driven by the gear unit 104. A spindle nut 108 can be displaced on the spindle 106 in the direction of the axis of rotation of the spindle 106 by rotating the same. This spindle nut 108 is connected to the cross-connection 62 by means of a connecting bar 110.

The entire driving device 50 is accommodated and attached within the basic body 46.

Metal or composite materials, such as, in particular, carbon fiber reinforced plastic, are possible materials for the basic body 46. The guide rails 40, 42 are preferably formed from metal, for example from aluminum.

The carriage assembly 48 preferably formed from metal, particularly from aluminum. In this case, the cross-connection 62, which can be referred to as a spindle arm, can also be made of extruded aluminum in order to enable a high bending capacity. The main carriage body 68 can be made from milled aluminum in order to enable a high level of load resistance and load transmission. The pivot arm 70 can be made from forged aluminum in order to compensate movements within the lift flap assembly 14.

Figure 17:
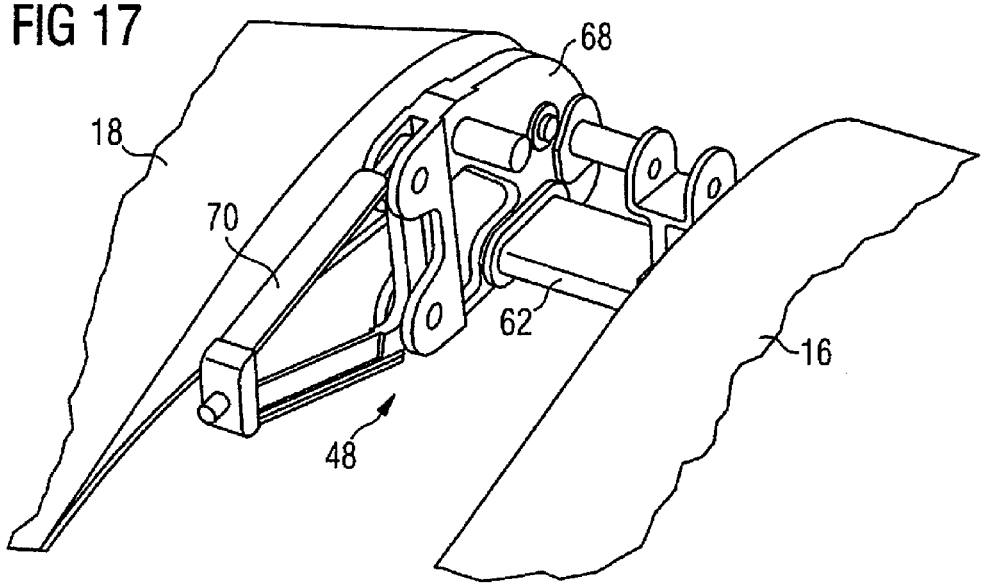
FIG. 17 shows a perspective schematic view of a portion of the carriage assembly with the hinge-mounted lift flap.

The respective individual components and the connection of the lift flaps 16, 18 are also easily apparent from FIGS. 17 and 18.

Figure 10:
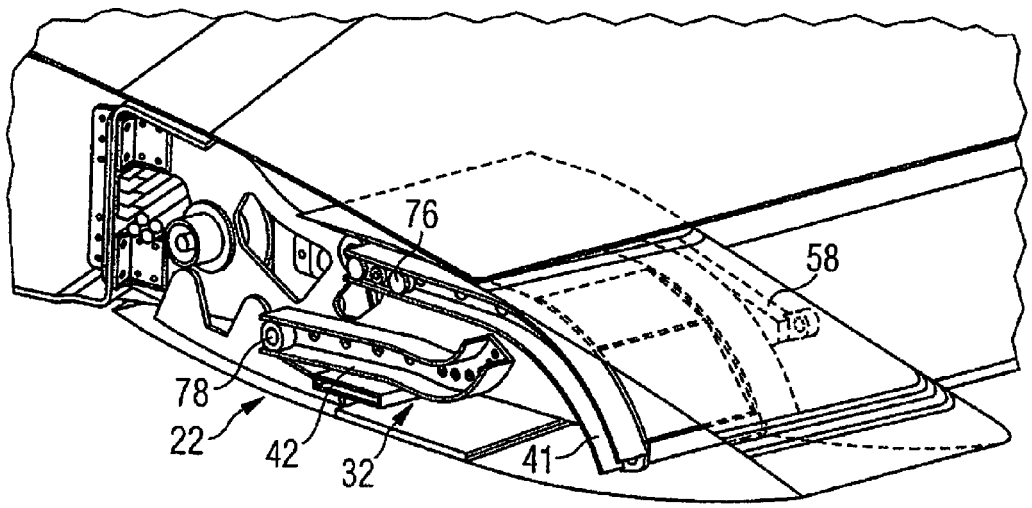
FIG. 10 shows another sectional perspective view through the rear region of the airfoil on another sectional plane for illustrating the integration of the guiding element.

FIG. 10 shows a partial sectional view through the rear edge region of the airfoil 10 and the lift flap assembly 14, the section being chosen in such a way that the second guiding device 32 with the first guide rail 40, the second guide rail 42 and the rail hinge mountings 72, 74 guided therein is apparent.

Figure 11:
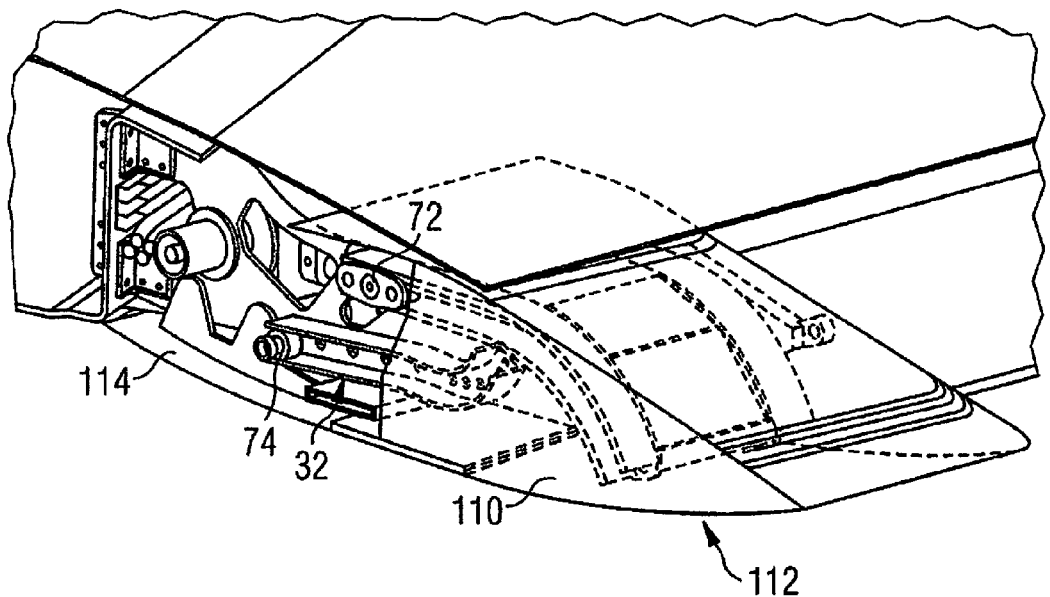
FIG. 11 shows another perspective sectional view comparable with FIGS. 9 and 10 on another sectional plane for illustrating a connection of a moveable fairing component.
Figure 12:
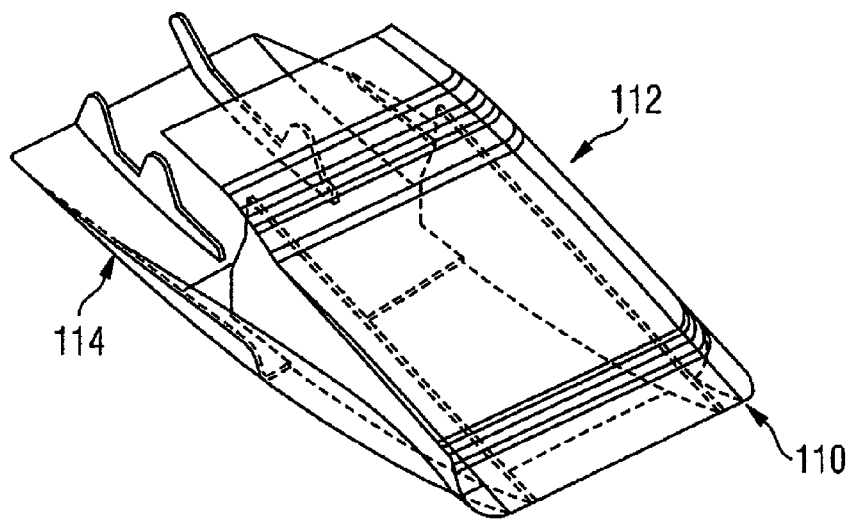
FIG. 12 shows a fairing for aerodynamically housing the lift flap bearing apparatus with a stationary fairing component and a moveable fairing component.

As is apparent from FIG. 11, a moveable fairing component 110 of an aerodynamic fairing 112 can also be attached to the carriage assembly 48. The entire aerodynamic fairing 112 is shown again without the other components of the lift flap bearing apparatus 22 in FIG. 12. The aerodynamic fairing 112 comprises the moveable fairing component 110 and a stationary fairing component 114 which is stationarily attached to the basic body 46. The two fairing components 110, 114 have overlapping regions 116, so that gaps can be minimized.

Figure 13:
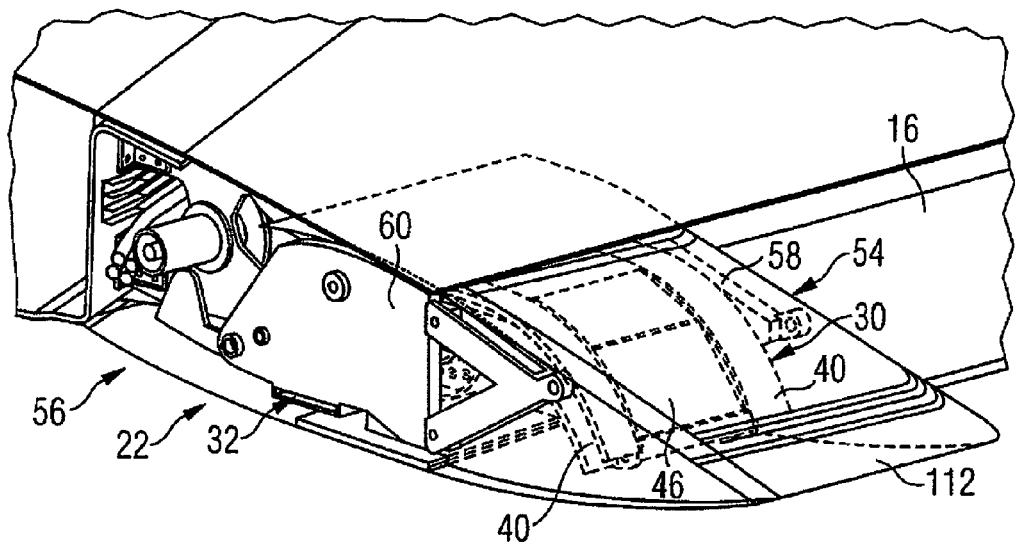
FIG. 13 shows a perspective sectional view comparable with the illustrations of FIGS. 9 to 11, with the section being made on another plane in order to display the arrangement of a guiding carriage in the airfoil.

FIG. 13 shows another section through the rear region of the airfoil 10 and the lift flap assembly 14, with the entire first lift flap bearing apparatus 22 with the basic body 46 and the carriage assembly 48 including the second guiding carriage 60 being shown.

Figure 14:
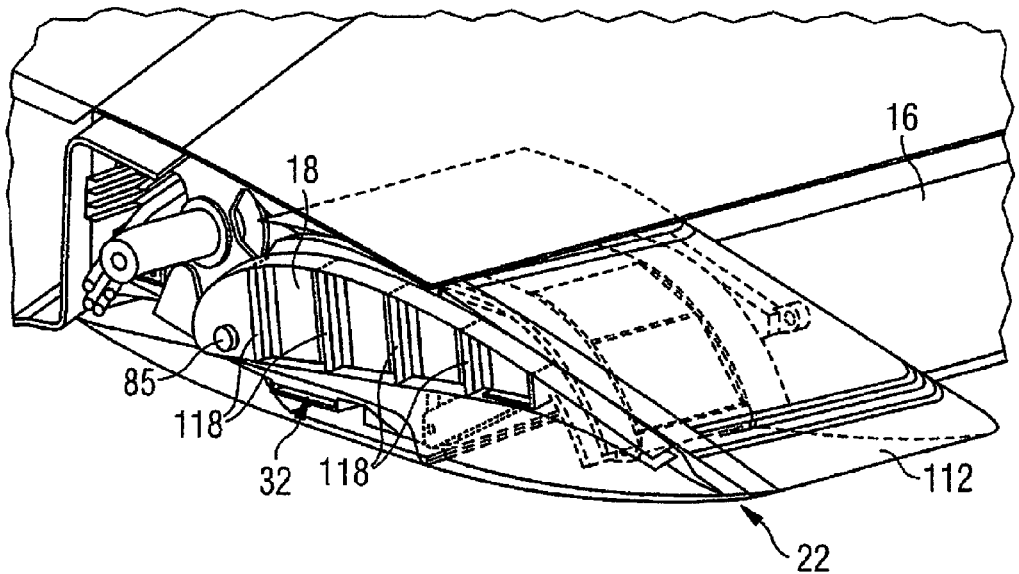
FIG. 14 shows an illustration comparable with FIGS. 9 to 11 and 13, sectioned on another longitudinal sectional plane for illustrating the hinge mounting of the lift flap.

As is apparent from the further sectional view of FIG. 14, the second lift flap 18, which is shown in profile here in order to show the internal structure of the lift flaps 16, 18, 20, can be hinged to this guiding carriage 60.

The lift flaps 16, 18, 20 are preferably manufactured from composite materials, such as, for example, fiber-reinforced plastics or metal or in a hybrid construction, in which composite materials and metals are used in combination. Other components of the lift flap bearing apparatus, such as, for example, at least one of the guiding carriages—particularly the second guiding carriage 60—, at least one of the flap attachment regions—particularly the second flap attachment region 66—, the pivot arm 70, at least one of the fairing components—particularly the moveable fairing component 110 and/or the stationary fairing component 114—and or the fairing 112 can be manufactured from composite materials, such as, for example, fiber-reinforced plastics or from metal, or in a hybrid construction, in which composite material(s) and metal(s) are used in combination.

As can best be seen from FIG. 14, a main body of the lift flap 16, 18, 20 is preferably provided with several transverse spars 118 for reinforcement. In the lift flap assembly 14 shown here, the lift flaps 16, 18, 20 are solely mounted via their lateral end regions and on their lateral end faces. Therefore, no hinge points on the broad surfaces of the lift flaps 16, 18, 20 are necessary, so that the structure can be simplified.

Figure 15:
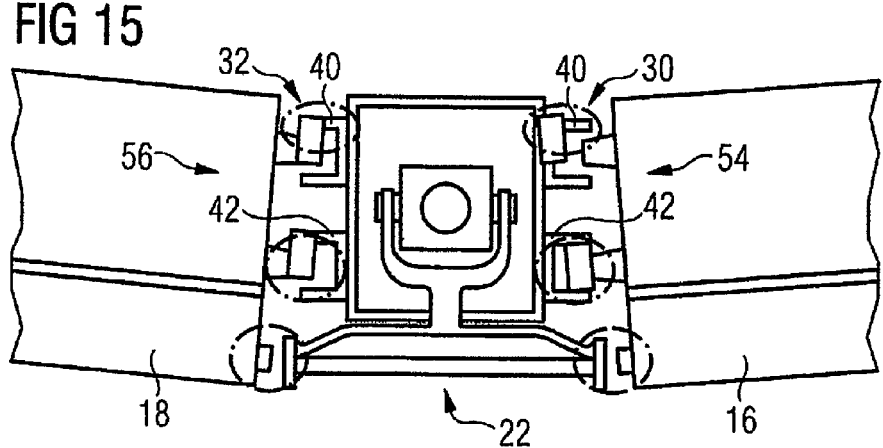
FIG. 15 shows a rear view onto a lift flap bearing apparatus in an embodiment without lateral guiding carriages.
Figure 16:
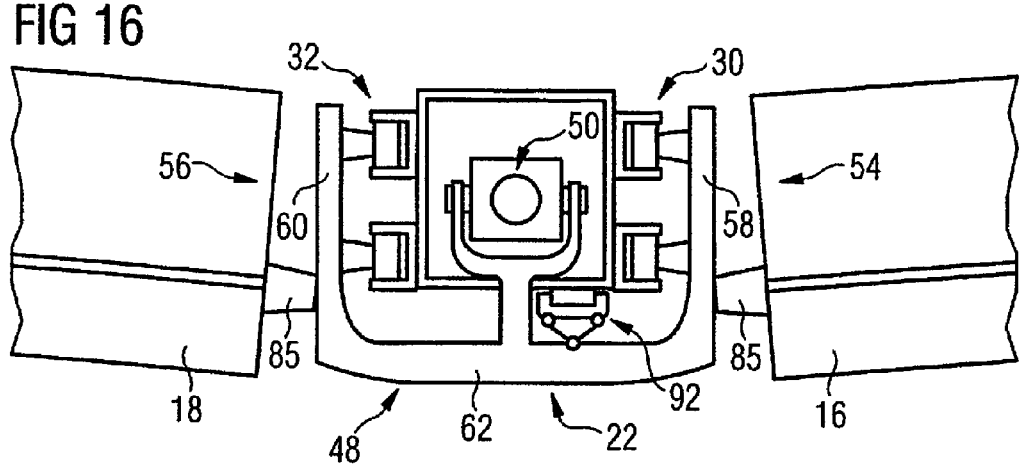
FIG. 16 shows an illustration comparable with the illustration of FIG. 15, wherein the lift flap bearing apparatus is shown with a surrounding carriage assembly with two lateral guiding carriages.

FIG. 15 shows an embodiment of the lift flap bearing apparatus 22 in which only a lower carriage is connected to the lift flaps 16, 18, 20, while the lift flaps 16, 18, 20 otherwise engage directly into the guide rails 40, 42. Though this configuration is also possible in principle, it entails the drawback indicated in FIG. 15, however, that bending of the airfoil 10 leads to stress in the guiding devices 30, 32, so that there is a higher amount of wear and the danger of misalignment. For comparative purposes, FIG. 16 shows an outline drawing of the preferred embodiment explained with reference to FIGS. 3 to 14 comprising the surrounding carriage assembly 48, which provides for reinforcement due to the surrounding and the lateral fixing, wherein the lift flaps 16, 18, 20 can be connected via the compensating guiding carriages 58, 60.

FIGS. 17 and 18 again show the function of these compensating guiding carriages 58, 60 and the overall structure of the lift flap bearing apparatus 22.

The structure of the lift flap bearing devices 26, 28 that mount the inner end of the inner lift flap 16 or the outer end of the outer lift flap 20 is not shown in close detail, but results from the structure of the lift flap bearing apparatus 22, which was explained in detail, by omitting one of the guiding devices and the driving device 50. Thus, the lift flap bearing devices 26, 28 are simply formed by one of the guiding devices 30, 32 with the correspondingly curved guide rails 40, 42, on which the lift flap 18, 20 is guided, either directly, as indicated in FIG. 15, or by intermediate mounting of the guiding carriage 58, 60. Thus, the lift flap assembly 14 shown here requires only two actuators for adjusting three lift flaps 16, 18, 20.

Figure 19A:
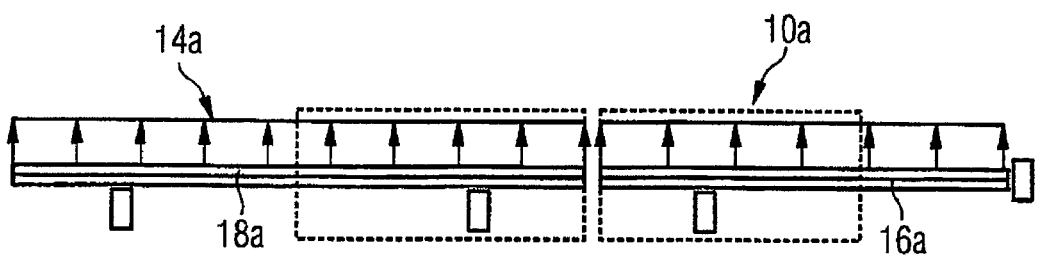
FIGS. 19a and 19b show two rear views onto a known airfoil (FIG. 19a) and onto an airfoil according to an embodiment of the invention (FIG. 19b) provided with lift flap bearing apparatuses according to embodiments of the invention.
Figure 19B:
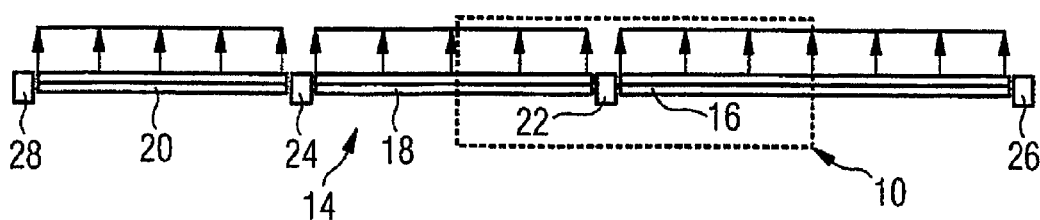
Figure 20A:
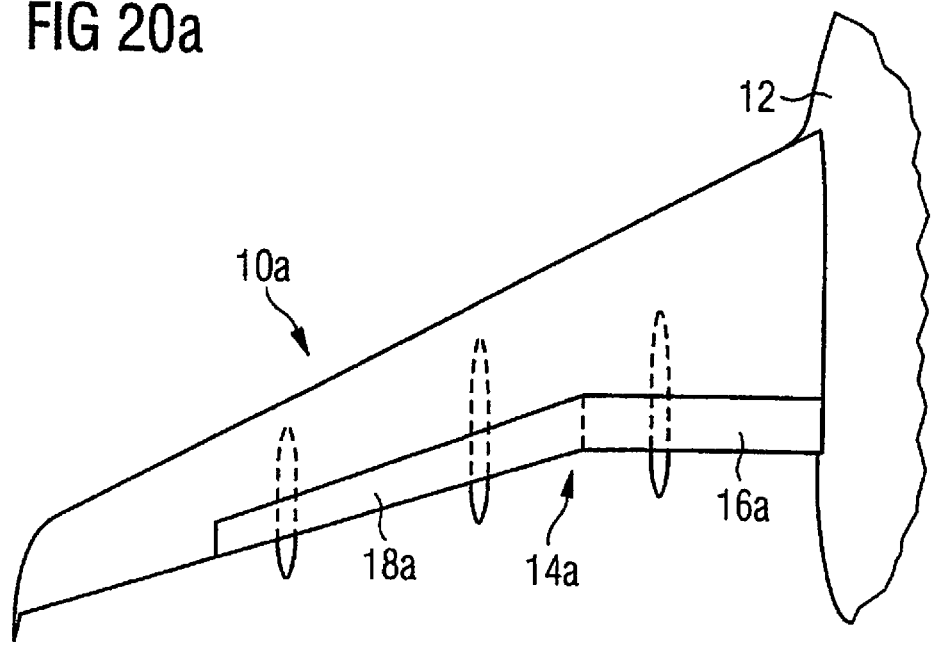
FIGS. 20a and 20b show plan views of the known airfoil (FIG. 20a) and the airfoil in an embodiment according to the invention (FIG. 20b) for further comparison.
Figure 20B:
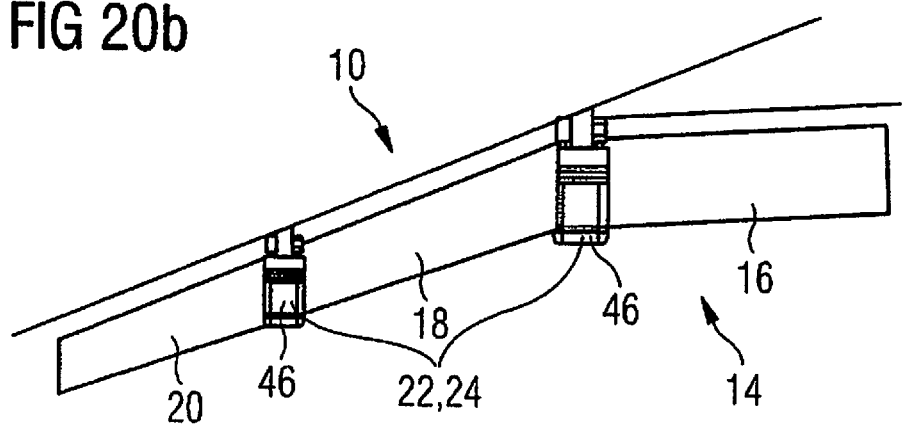
Figure 22:
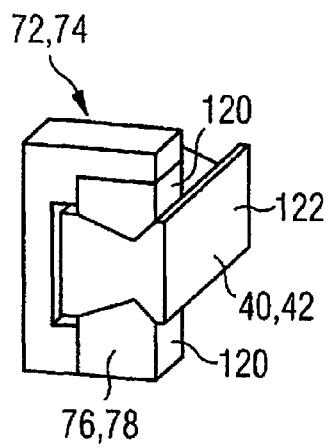
FIG. 22 shows a perspective schematic view of a portion of the guiding device of the further embodiment in engagement with a rail hinge mounting.

FIGS. 19*a* through 20*b* show comparisons of known airfoils 10*a* (as used in the Airbus A320 aircraft) with an embodiment according to the invention of the airfoil 10, with FIGS. 19*a* and 20*a* showing the known airfoil 10*a* and FIGS. 19*b* and 20*b* showing the airfoil 10 of the embodiment according to the invention. The lift flap assembly 14*a* of the known airfoil 10*a* comprises two lift flaps 16*a*, 18*a*, which are each adjustable and driven from a central region of the lift flaps 16*a*, 18*a*, i.e. with a design as it is explained in principle in EP 0 503 158 A1 or WO 03/008266 A1.

Even though this known design has proved a success in use with regard to improving aerodynamics, it is clear that the lift flap assembly 14 configured according to the invention makes possible an even smaller construction space and an even better aerodynamic integration of the lift flap assembly 14 into the airfoil 10.

Of course, deviating numbers of lift flaps 16, 18, 20 are also possible in the embodiments that are not shown in more detail. A lift flap assembly 14 which comprises only two lift flaps, for example the first lift flap 16 and the second lift flap 18 and only one lift flap bearing apparatus 22 between them, would also be conceivable. Embodiments with more than three lift flaps are also conceivable, wherein one lift flap bearing apparatus 22, 24, respectively, is preferably provided between two adjacent lift flaps, respectively, for joint mounting and driving.

In the embodiments explained above with reference to FIGS. 1 to 20*b*, roller assemblies 80 or rollers 82 are used as gripping members 76, 78 for gripping the guide rails 40, 42. In contrast, FIGS. 21*a* to 30 show additional possible embodiments of the gripping members 76, 78 and profiles of the guide rails 40, 42 adapted thereto. In this case, sliding members 120 are used as gripping members 76, 78.

Figure 23:
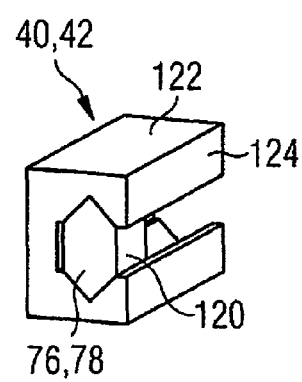
FIG. 23 shows an illustration comparable with FIG. 22 according to another embodiment.
Figure 24:
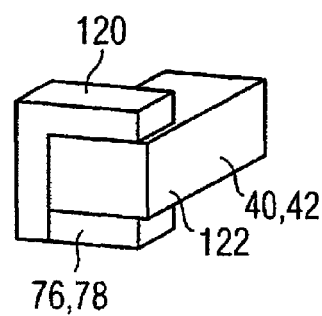
FIG. 24 shows an illustration comparable with FIGS. 22 and 23 according to yet another embodiment.
Figure 25:
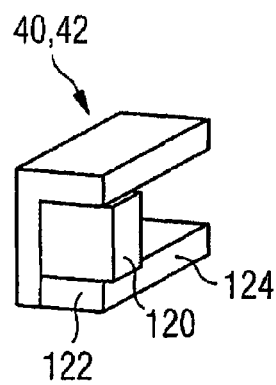
FIG. 25 shows an illustration comparable with FIGS. 22 to 24 for yet another embodiment.

In this case, FIGS. 21*a* through 21*c*, 22 and 24 show an embodiment in which a guide rail 122 is gripped on the outside by the associated rail hinge mounting 72, 74 with two sliding members 120. In contrast, FIGS. 23 and 25 show embodiments in which C-shaped guide rail profiles or U-shaped guide rail profiles 124 surround a sliding member 120 guided therein.

In this case, FIGS. 21*a* through 21*c*, 22 and 23 show a positive grip between the sliding member 120 and the guide rail 122, so that a lateral fixing within the guiding device 30, 32 can be accomplished at the same time. FIGS. 24 and 25 show embodiments with which a purely frictional grip between the guide rail 122 and the sliding member 120 was realized, so that lateral movements can also be compensated.

In three individual illustrations FIG. 21a, FIG. 21b and FIG. 21c, shows how the respective embodiments of FIGS. 22 to 25 can be realized in the lift flap bearing apparatus 22. To this end, the respective guide rails 40, 42 are replaced by the guide rails 122 (FIG. 21b) and the rail hinge mountings 72, 74 are replaced by the grip between the sliding member 120 and the guide rail 122 (FIG. 21c).

Figure 26:
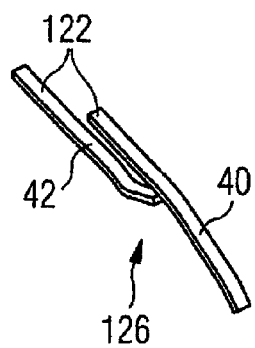
FIG. 26 shows a schematic view of a portion of a guiding device according to yet another embodiment of the invention.

FIG. 26 shows an alternative guide rail assembly 126, with the first guide rail 40 and the second guide rail 42 each comprising the surrounding guide rail profile 124.

Figure 27:
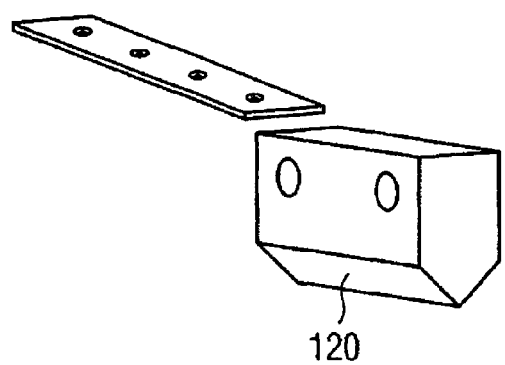
FIG. 27 shows a schematic view of a sliding member as an engaging member for a rail hinge mounting according to yet another embodiment of the guiding device.

Either a positive grip or a frictional grip (without positive contact) is provided in the embodiments of FIGS. 22 to 25. In contrast, FIG. 27 shows an embodiment of the rail hinge mounting 72, 74 in which one side of the sliding member 120 is configured for a positive grip and another side for a frictional grip. Here, the cross section shows a flattened side of the sliding member 120, for example on top, and, for example on the bottom, a side with a projection (or alternatively a recess—not shown).

There may also be adaptive modifications with regard to the surface configuration in the longitudinal direction of the sliding member 120. In a schematic view and a perspective view, FIG. 28 shows a configuration of the sliding member 120 with a unilaterally flat side and a rounded side. FIG. 29 shows an embodiment of the sliding member 120 (configured as a surrounding sliding member) in which flat regions are combined with convex regions. FIG. 30 shows an embodiment of the sliding member 120 with a configuration which, viewed in the longitudinal direction of the sliding member 120, is first convex, then concave, and finally convex again. The latter embodiment of the sliding member 120 is the most preferred, because a support of the sliding member 120 against twisting and/or a support on a larger supporting region is made possible thereby, with a nevertheless relatively small contact surface coming into engagement.

The invention claimed is:

1. A lift flap bearing apparatus for guiding and adjusting a first lift flap and a second lift flap, the lift flap bearing apparatus comprising
    a first guiding device configured to guide the first lift flap and a second guiding device configured to guide the second lift flap, the first and the second guiding devices each having a first curved guide rail and a second curved guide rail.

2. The lift flap bearing apparatus according to claim 1, wherein
    the first guiding device is disposed on a first side of the lift flap bearing apparatus and the second guiding device is disposed on a second side that is orientated opposite to the first side.

3. The lift flap bearing apparatus according to claim 1, further comprising
    a driving device configured to simultaneously adjust the first and second guiding devices.

4. The lift flap bearing apparatus according to claim 1, wherein
    at least one of the guiding devices comprises a guiding carriage which is displaceably guided by a first rail hinge mounting on a first curved guide rail of the guiding device, and is displaceably guided by a second rail hinge mounting on a second curved guide rail.

5. The lift flap bearing apparatus according to claim 4, wherein
    the at least one guiding carriage comprises a first flap attachment region with at least one first flap attachment device and a second flap attachment region with at least one second flap attachment device, the first and second flap attachment devices being spaced apart, and the first and second flap attachment regions of the guiding carriage being attached to one another so as to be moveable relative to one another in a direction extending transverse to an adjusting direction guided by the guiding device.

6. The lift flap bearing apparatus according to claim 4, wherein
    the first and the second guiding devices are each provided with the guiding carriage, the first guiding carriage of the first guiding device and the second guiding carriage of the second guiding device being rigidly interconnected by a cross-connection.

7. The lift flap bearing apparatus according to claim 1, further comprising
    a basic body that is configured to attach to an airfoil and comprises on a first side the first and the second guide rails of the first guiding device and on a second side, which is orientated opposite to the first side, the first and the second guide rails of the second guiding device.

8. The lift flap bearing apparatus according to claim 7, further comprising
    a carriage assembly comprising the first guiding carriage, the second guiding carriage and the cross-connection that surround the basic body.

9. The lift flap bearing apparatus according to claim 8, wherein
    the driving device is disposed in the basic body and acts on the cross-connection.

10. The lift flap bearing apparatus according to claim 4, wherein at least one of the following
    at least one of the rail hinge mountings comprises at least one roller that acts on at least one roller track of the guide rail associated with the at least one of the rail hinge mountings; and
    that at least one of the rail hinge mountings comprises at least one sliding member that acts on a sliding track of the guide rail associated with the at least one of the rail hinge mountings.

11. The lift flap bearing apparatus according to claim 4, wherein
    at least one of the rail hinge mountings is in positive engagement with one of the guide rails in order to absorb lateral transverse forces.

12. The lift flap bearing apparatus according to claim 4, wherein
    the first rail hinge mounting is displaceably supported on a first supporting surface on the first guide rail, while the second rail hinge mounting is displaceably supported on a second supporting surface on the second guide rail, at least one of the first supporting surface being larger than the second supporting surface and the first supporting surface extending over a greater distance in a displacement direction than the second supporting surface.

13. A lift flap assembly comprising:
    a first lift flap;
    a second lift flap; and
    the lift flap bearing apparatus according to claim 1 which is disposed between the first and the second lift flaps.

14. An airfoil for an aircraft, comprising a lift flap assembly according to claim 13.

15. An aircraft comprising at least one airfoil according to claim 14.

16. An airfoil for an aircraft, comprising a lift flap bearing apparatus according to claim 1.

17. An aircraft comprising a lift flap bearing apparatus according to claim 1.

18. An aircraft comprising a lift flap assembly according to claim 13.

19. The lift flap bearing apparatus according to claim 2, further comprising
a driving device configured to simultaneously adjust the first and second guiding devices.

20. The lift flap bearing apparatus according to claim 1, wherein
at least one of the guiding devices comprises a guiding carriage which is displaceably guided by a first rail hinge mounting on a first curved guide rail of the guiding device, and is displaceably guided by a second rail hinge mounting on a second curved guide rail.

* * * * *